United States Patent [19]

Herndon

[11] 3,933,372

[45] Jan. 20, 1976

[54] TRAILER STABILIZER

[76] Inventor: Robert R. Herndon, 206 Woodlawn St., Smithville, Tex. 37166

[22] Filed: Mar. 27, 1974

[21] Appl. No.: 455,226

Related U.S. Application Data

[63] Continuation-in-part of Ser. No. 260,656, June 7, 1972, Pat. No. 3,801,128.

[52] U.S. Cl. .............................................. 280/150.5
[51] Int. Cl.² ............................................ B60S 9/02
[58] Field of Search ....... 280/150.5; 248/354 R, 166

[56] References Cited
UNITED STATES PATENTS

| | | | |
|---|---|---|---|
| 3,454,251 | 7/1969 | Dye ............................ | 280/150.5 X |
| 3,475,008 | 10/1969 | Taylor ........................... | 280/150.5 |
| 3,656,778 | 4/1972 | Bristol ......................... | 280/150.5 |
| 3,709,518 | 1/1973 | Ganchet ........................ | 280/150.5 |
| 3,767,226 | 10/1973 | Stephens ........................ | 280/150.5 |

*Primary Examiner*—Robert R. Song
*Attorney, Agent, or Firm*—Terry M. Crellin

[57] ABSTRACT

A pair of extensible leveling and stabilizing legs are connected pivotally to the underside of a trailer, the legs can be raised from their ground engaging position extending downward to the ground in an outward direction transverse to the longitudinal axis of the trailer, to a retracted position extending parallel to the underside of the trailer. Force means are provided which tend to move the legs toward each other and thus continuously maintain stabilizing and leveling contact of the ground engaging portion of the legs with the ground. The force means can also be used to maintain the legs in a raised and retracted position.

3 Claims, 3 Drawing Figures

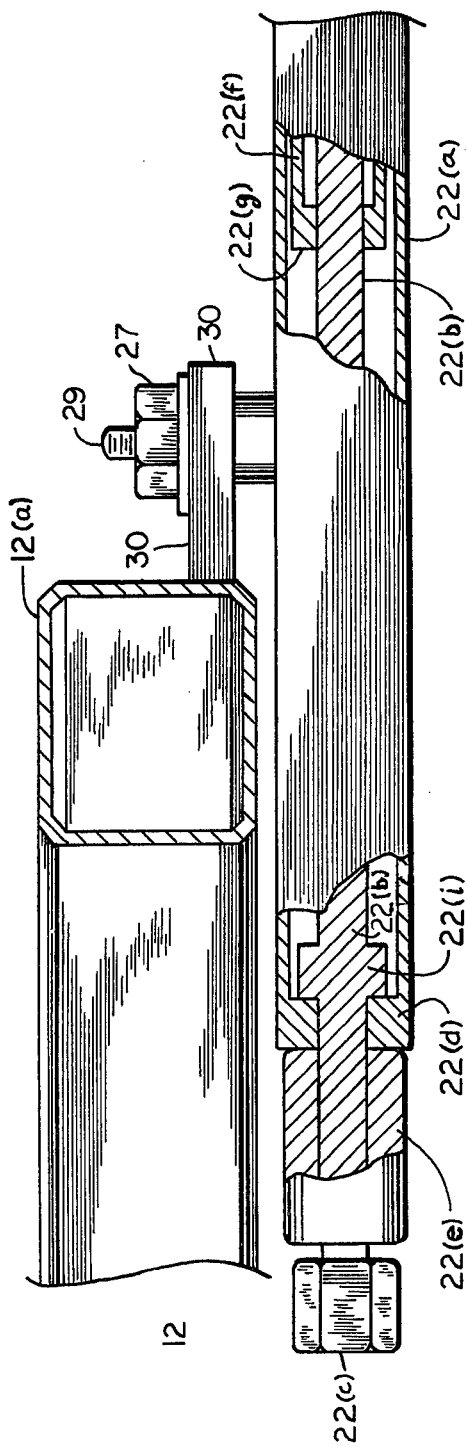
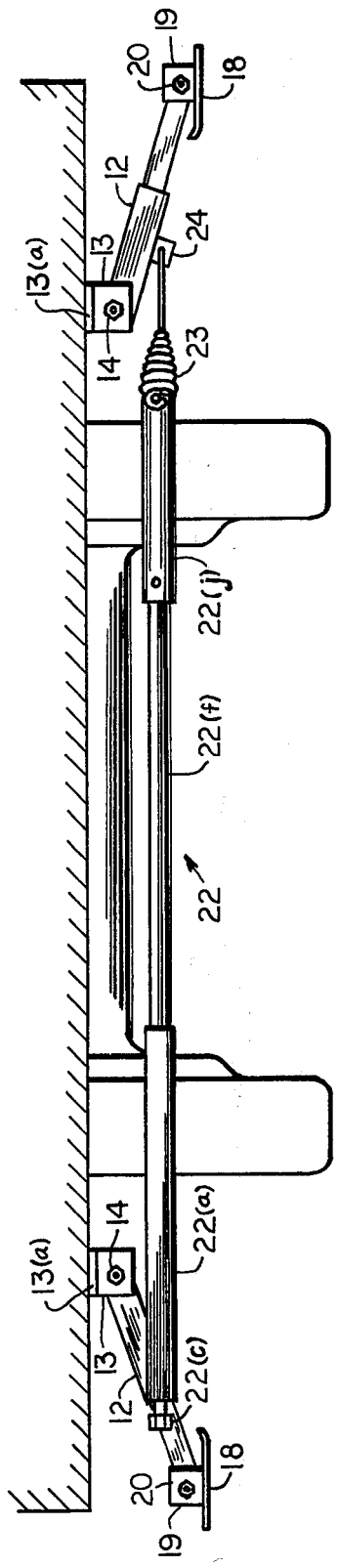

TRAILER STABILIZER

This application is a continuation-in-part of my co-pending application, Ser. No. 260,656, filed June 7, 1972, now U.S. Pat. NO. 3,801,128 the entire contents of which are incorporated herein by reference.

BACKGROUND OF THE INVENTION

The present invention relates to an improved device for supporting parked trailers in a level and stable condition. In addition, the present device automatically adjusts as the ground underneath the support compacts or shifts due to weight of the trailer and the movement of people within the trailer, thus retaining stable and level support of the trailer. Further, the improved trailer supporting device of the present invention can be retracted and held beneath the trailer during periods of non-use of the supporting device, such as when the trailer is being pulled on the road.

A retractable stabilizing and leveling support assembly for trailers is disclosed in U.S. Pat. No. 3,454,251, issued July 8, 1969, comprising a pair of extensible legs connected pivotally to laterally spaced longitudinal beams of a trailer frame. The legs are interconnected when in the supporting position by elongated tie rods which are adjustable in length to accommodate variable spacings between legs. The tie rods are removable, whereupon the supports can be swung up and individually latched in a retracted position.

The trailer support assembly of U.S. Pat. No. 3,454,251 has several inconvenient features, especially when utilized to stabilize trailers such as mobile homes or campers. In positioning the stabilizer apparatus of U.S. Pat. No. 3,454,251, several steps are necessary, including loosening of the pivot nut, swinging the support leg down, adjusting the length of the support leg and finally connecting the tie rods between the two stabilizer legs. Such a tedious, time conuming procedure is not convenient, especially when the trailer is a mobile home or trailer which is frequently being moved and where the stabilizer apparatus is being positioned and retracted quite frequently. The support legs in the apparatus of U.S. Pat. No. 3,454,251 must each be individually raised or lowered. It would be convenient to have a stabilizer system for mobile homes, campers and other trailers which are frequently moved, which can be positioned and retracted in a simple manner requiring no outside tools or equipment.

In addition, it would be desirable to have a stabilizer apparatus which would automatically adjust to compensate for compacting or moving of the earth or other support on which the stabilizer rests. Mobile homes are especially prone to settling problems, due to the movement of persons within the house trailer, which creates a rocking and tilting motion, which in turn transfers the major portion of the weight of the trailer from one support to the other. The ground underneath the supports tends to compact under this rocking and tilting and ultimately the support becomes loose. With the devices of the prior art, one had to adjust each leg manually to counteract this loosening tendency.

A device is shown in U.S. Pat. No. 2,924,463 wherein the support legs pivot from the frame of the trailer and rest on the ground at an angle. A support member having a section of chain is hooked between the two legs. To adjust the legs, the weight of the trailer must be lifted by an auxiliary means so that the support legs are free. The chain member portion of the support member is shortened so as to draw the two legs together or lengthened to allow the two legs to separate, depending on whether the adjustment made is to raise or lower the support for the trailer. This is a disadvantage to the trailer owner each time he desires to readjust the support legs.

Other methods of adjusting the length of the support legs using methods similar to the common means used in jacking of an automobile to change a tire are disclosed in U.S. Pat. Nos. 2,162,181, 2,634,941, 2,979,304, 3,093,362, 3,096,065 and 3,167,327.

SUMMARY OF THE INVENTION

Broadly, the present invention provides a trailer stabilizing and leveling support assembly comprising two support members which are pivotally connected by attachment means to the bottom of the trailer frame and means for applying a force to the support members in a direction transverse to the trailer so as to move the leg assemblies towards or away from each other. A preferred means for applying the force to the support members being an elongate member of adjustable length and a spring tension mechanism connecting the two support members. The spring tension member being connected from one end of the elongate members to one support member. The other end of the elongate member is connected to the other support member and means are provided for adjusting the length of the elongate member. As the elongate member is lengthened, the support members are pivoted into a retracted position adjacent the underside of the trailer. When the elongate member is shortened, the support members are swung downward until they extend downward and outward from the trailer and a foot member on the ends of the support members engage the ground. Continued shortening of the elongate member extends the spring tension member providing a continuous force tending to move the support members towards each other thereby maintaining constant engagement between the foot members and the ground. As the trailer is rocked or tilted by movement of people therein, the ground underneath the foot members may compact or give away. If this happens, the apparatus of the present invention automatically counteracts such by the two support members being drawn towards each other, thus, maintaining the foot members in firm contact with the ground.

It is thus the principal object of the present invention to provide a stabilizing and leveling support assembly which overcomes the complex and tedious operation involved in engaging and retracting the support members for a mobile trailer of the prior art apparatus.

Another important object of the present invention is to provide a stabilizing and support assembly which automatically adjusts for compacting and shifting of the ground underneath the support leg, which if not adjusted for, results in the support leg becoming loose which allows the trailer to become unstable.

The foregoing and other objects and advantages of this invention will appear from the following detailed description taken in connection with the accompanying drawing of the preferred embodiment.

BRIEF DESCRIPTION OF THE DRAWING

FIG. 2 is a partial cross-section taken along line 2—2 of FIG. 1.

FIG. 3 is an end elevation showing the apparatus of FIG. 1 in its retracted position.

DESCRIPTION OF THE PREFERRED EMBODIMENT

Figure 1:
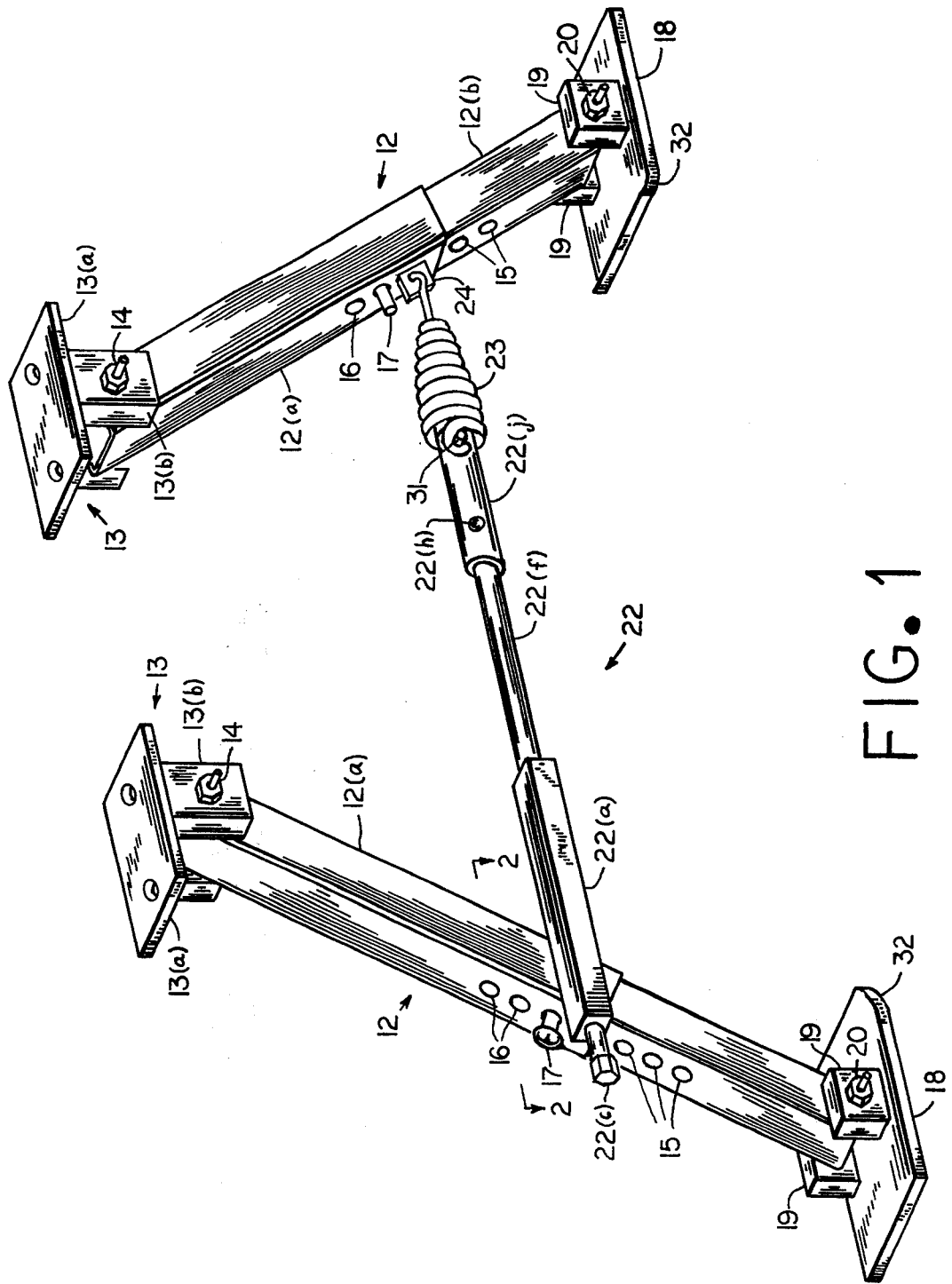
FIG. 1 is a perspective view showing one preferred embodiment of the stabilizing and leveling support assembly of this invention.

Referring to FIG. 1, there is shown for purposes of illustration, a perspective view of one preferred embodiment of the apparatus of the present invention. The apparatus comprises two leg members 12 which have attaching means 13 attached at one end thereof. The attaching means shown comprises plate 13(a) and a channel shaped bracket 13(b). Leg assemblies 12 are attached by nut and bolt 14 to the channel shaped members 13 for pivotal movement in a vertical plane.

Each leg member 12 comprises two elongated, hollow sections 12(a) and 12(b). The lower leg section 12(b) is received slidably within the hollow upper leg section 12(a) for telescopic adjustment. The lower section 12(b) has a plurality of transverse openings 15 therein located along its length. Section 12(a) has at least a single opening 16 and, preferably, a plurality of openings 16. The openings 15 and 16 are arranged respectively to register in pairs for the reception of a locking pin 17. The leg sections thus may be secured together in a plurality of desired positions of relative extension and retraction, to provide a desired overall leg length. To provide incremental adjustment, the spacing between opening 16 in the upper leg section is made different from the spacing between openings 15 in the lower section. For example, by spacing the openings in the lower leg section 12(b) three-quarters of an inch between centers and in the upper leg section 12 a one-half inch between centers, incremental adjustments of one-quarter inch are provided. Alternatively, a single opening can be placed in upper section 12(a) and the openings spaced one-half inch between centers in the lower section 12(b) whereupon incremental adjustments of one-half inch are provided.

The bottom end of the lower leg section 12(b) is provided with a ground engaging foot member 18 pivotally attached thereto. As is shown in FIG. 1, two brackets 19 are integrally attached to foot means 18 enclosing two sides of the bottom and of leg section 12(b). A nut and bolt 20 secures the foot member to the end of leg member 12(b) so that the foot member 18 can rotate about the longitudinal axis of the nut and bolt 20.

Means are provided for maintaining a force tending to move the leg members toward and away from each other. In the embodiment shown in the drawings, an elongate member 22 of adjustable length and a spring 23 connect the leg members 12. The elongate member 22 and spring 23 are longitudinally attached to each other end to end so that the spring 23 extending from one end of the elongate member 22 is attached at its other end to one of the leg members 12 (in FIG. 1 the spring is shown attached to a lug 24 which is in turn attached to the right leg member 12). The second leg member 12 is pivotally attached to elongate member as is shown best in FIG. 2. A lug 30 is attached to the upper leg section 12(a) and a bolt 29 is attached to elongate member 22 extending transversely therefrom. Bolt 29 extends through an opening in lug 30 and is held in that position by nut 27.

The elongate member 22 comprises a tubular member 22(a) having a square cross-section. An elongate rod 22(b), FIG. 2, extends into one end of tubular member 22(a). The end of elongate rod 22(b) extending from tubular member 22(a) has the shape of a lug 22(c) so that it can engage with a lug wrench or crank and rotated about its longitudinal axis. A bearing member 22(d) is integrally attached to the end of tubular member 22(a) and bushing 22(e) is positioned between the lug 22(c) portion of elongate rod 22(b) and bushing 22(e). A second tubular member 22(f) extends telescopically into the other end of tubular member 22(a). A nut 22(g) on the end of tubular member 22(f) engages threads on rod 22(b), so that as rod 22(b) rotates, nut 22(g) and tubular member 22(f) moves longitudinally back and forth in tubular member 22(a). The nut 22(g) is sized so that it cannot turn inside tubular member 22(a) but is free to move longitudinally within tubular member 22(a). The other end of tubular member 22(f) is received telescopically by a length adjusting member 22(j). There is an opening in adjusting member 22(j) and a plurality of openings in the end of tubular member 22(f). The openings in tubular member 22(f) can be aligned with the opening in adjusting member 22(j) and a pin member 22(h) is inserted therethrough. The adjusting member 22(j) is in turn attached to spring 23.

When lug 22(c) is rotated in one direction, the elongate member 22 is shortened due to the nut 22(g) advancing towards lug 22(c). Bushing 22(e) prevents rod 22(b) from moving longitudinally within tubular member 22(a) as the elongate member 22 is shortened. Rotating the lug 22(c) in the opposite direction results in lengthening elongate member 22 due to the nut 22(g) receeding away from lug 22(c). Bearing ring 22(i) prevents rod 22(b) from moving longitudinally within tubular member 22(a) as the elongate member 22 is shortened. When elongate member 22 is shortened the leg members 12 are drawn towards each other and into their downward, ground extending position as shown in FIG. 1. When the elongate member 22 is lengthened, the leg members 12 are pushed away from each other rotating upwards and towards the underside of the trailer as shown in FIG. 3.

The stabilizer assembly is normally installed on both the front or back ends of the trailer; however, this is not essential, the stabilizer assembly can be installed on the front alone or the back alone in addition to being installed on both. The stabilizer assembly can be installed during the manufacture of the trailer or can be installed as an addition to an existing trailer. The assembly is identical in construction and operation whether installed on the front or the back end of the trailer, the rear assembly is illustrated in FIG. 3.

Each leg member is detachably secured to the trailer by appropriate means without modifying the trailer. In the drawings, plate 11 is attached to the underside of the trailer and, preferably, to the frame of the trailer.

The desired length of the leg member 12 can be predetermined with reference to the particular trailer to which it is to be secured. The only critical requirement as to length of leg members 12 is that it be adjustable to be greater than the perpendicular distance from the ground to the plate 11. Normally, the desired length is selected so that the leg member 12 is inclined at an angle of approximately 30° with respect to perpendicular, however, as mentioned above, this is not critical. The particular length of leg member 12 is adjusted as explained hereinbefore by withdrawing pin 17 and extending member 12(b) to a position within the desired range where the openings in member 12(a) and 12(b) register and then replacing pin 17. Under normal conditions, this length need never be readjusted. However, if the trailer is parked where the ground on which the support leg rests is somewhat higher or lower than the ground upon which the trailer wheels are resting, it may be necessary to adjust the length of the leg members 12 accordingly. The leg members 12 are positioned so that they extend downward and outward in a lateral direction away from longitudinal axis of the trailer as shown in FIG. 2 and in phantom in FIG. 3 with the foot members 18 on the ends thereof resting on the ground.

The rod 22 and spring 23 are attached to each other as is shown in FIG. 1 by hooking an eye shaped portion of the spring 23 onto a hook 31 on the rod 22. The rod extends coaxially into a portion of the spring 23. The free end of the spring 23 is attached to one of the leg members 12, as explained hereinbefore.

The leg assemblies can be lowered from the position shown in FIG. 3 by rotating lug 22(c) with a lug wrench or a crank. As the leg assemblies lower the foot members 18 touch the ground. Continued rotation of lug 22(c) then extends spring 23 resulting in a force tending to pull the leg members 12 towards each other equal to the force exerted by the extended spring 23. The tension of the spring 23 holds the leg members 12 securely against the ground. As the ground compacts or shifts under the weight of the trailer and its occupants, the spring tension draws the leg members together and thus automatically adjusts the leg members so that constant contact is made with the ground.

Varying sized springs having varying spring constants can be utilized in practicing the present invention. It is preferred that the spring constant be approximately 100 pounds per inch or greater, however, this is not critical. The ground engaging foot members 18 preferably have upwardly curved edges 32 on the sides of the foot members which are toward the center of the trailer as shown in FIG. 1 to allow the foot member to move under the tension of spring 23 without digging into the ground.

The leg assemblies can be raised to their retracted position shown in FIG. 3 by rotating lug 22(c) in the opposite direction to that used in lowering the legs. The elongate number 22 lengthens and forces the leg assemblies to rotate into their retracted position.

It will be apparent to those skilled in the art that various changes may be made in size, shape, number and arrangement of parts described hereinbefore without departing from the spirit of this invention. The leg members 12 can be round rather than rectangular as shown in FIGS. 1 – 3. When round legs are used, the upper section is provided with internal threads and the lower section provided with external threads. The ground engaging foot member 18 is attached to the lower leg section so that it can rotate about its longitudinal axis. With this modified leg apparatus, the trailer can be leveled after the legs have been situated in their support position. That is, if after the stabilizing and supporting position, it is found that one corner of the trailer is low with respect to another, the low corner can be jacked up by rotating the lower leg section, thus extending the lower leg section further from the upper leg section. The low corner is thus raised with respect to the other corners. If the corner had been high rather than low, the lower leg section would have been rotated so that it retracts into the upper leg section, thus lowering the high corner with respect to the other corners.

The elongate member 22 and spring 23 can be connected to the leg at any point therealong between their ends. Preferably, they are connected to the mid-portion of the leg assemblies 12, and it is particularly advantageous to connect them to the lower portion of the upper section 12(a) of leg assemblies 12.

What is claimed is:

1. A stabilizing and leveling support assembly for trailers, comprising:
   a. a pair of extensible leg assemblies,
   b. means for attaching one end of said leg assemblies to the underside of a trailer, one leg assembly adjacent each lateral side of the trailer with said leg assemblies being secured by said attaching means for pivotal movement of said leg assemblies between an operative position extending downward and outward from the trailer and a raised position extending outward from the trailer and generally adjacent to the underside of the trailer,
   c. an elongate member of adjustable length with one end of said elongate member having a spring attached axially thereto with the other end of said spring being pivotally connected to one of said leg assemblies, and with the other end of said elongate member pivotally connected to the other leg assembly,
   d. means for adjusting the length of said elongate member thereby applying a force to said leg assemblies in a direction transverse to the trailer and towards or away from each other, said force tending to move the respective leg assemblies towards each other when the length of said elongate member is shortened and away from each other with the length of said elongate member is lengthened.

2. A stabilizing and leveling support assembly for trailers as claimed in claim 1 wherein the elongate member comprises two elongate sections with one section being received in the other for telescopic adjustment.

3. A stabilizing and leveling support assembly for trailers as claimed in claim 2 wherein one end portion of the first elongate section is attached to the first leg assembly through a journal bearing, the other end portion of the first elongate section being threaded, the one end portion of the second elongate section being hollow with internal threads which engage the threads on the first elongate section, a spring is attached axially to the other end of the second elongate section, the other end of the spring being attached to the second leg assembly, and the means for adjusting the length of said elongate member comprises means for rotating said first elongate section.

* * * * *